(12) United States Patent
Guenter

(10) Patent No.: US 8,149,240 B2
(45) Date of Patent: Apr. 3, 2012

(54) EFFICIENT SYMBOLIC DIFFERENTIATION USING DERIVATIVE GRAPH FACTORIZATION

(75) Inventor: Brian K. Guenter, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1259 days.

(21) Appl. No.: 11/672,475

(22) Filed: Feb. 7, 2007

(65) Prior Publication Data

US 2008/0189345 A1 Aug. 7, 2008

(51) Int. Cl.
*G06T 11/20* (2006.01)

(52) U.S. Cl. ........................................................ 345/440

(58) Field of Classification Search ........................ None
See application file for complete search history.

(56) References Cited

U.S. PATENT DOCUMENTS

| | | | | |
|---|---|---|---|---|
| 5,136,686 | A | * | 8/1992 | Koza .............................. 706/13 |
| 5,655,136 | A | | 8/1997 | Morgan |
| 5,764,241 | A | * | 6/1998 | Elliott et al. .................. 345/473 |
| 5,798,923 | A | | 8/1998 | Laskowski |
| 5,999,192 | A | * | 12/1999 | Selfridge et al. .............. 345/440 |
| 6,308,300 | B1 | * | 10/2001 | Bushnell et al. ................... 716/4 |
| 6,397,380 | B1 | | 5/2002 | Bittner et al. |
| 6,826,521 | B1 | | 11/2004 | Hess et al. |
| 6,895,574 | B2 | * | 5/2005 | Walster ......................... 717/106 |
| 2002/0122003 | A1 | * | 9/2002 | Patwari et al. ................ 342/450 |
| 2003/0105614 | A1 | | 6/2003 | Langemyr et al. |
| 2006/0015514 | A1 | * | 1/2006 | Suga ............................ 707/100 |
| 2007/0006151 | A1 | * | 1/2007 | Conway et al. ............... 717/120 |
| 2009/0228263 | A1 | * | 9/2009 | Kamatani et al. ................. 704/4 |

OTHER PUBLICATIONS

CS553, "Machinery for Placing φ-Functions Dominance Frontier Example . . . ", Oct. 23, 2006, URL: http://www.cs.colostate.edu/~mstrout/ CS553Fall06/slides/lecture17-SSA.pdf.*
Agarwala, A., M. Agrawala, M. F. Cohen, D. Salesin, R. Szeliski, Photographing long scenes with multi-viewpoint panoramas, ACM Trans. Graph., 2006, pp. 853-861, vol. 25, No. 3.
Bauer, F. L., Computational graphs and rounding error, SIAM J. Numer. Anal., 1974, pp. 87-96, vol. 11.
Bischof, C. H., A. Carle, G.F. Corliss and A. Griewank, Adifor: Automatic differentiation in a source translator environment, Int'l Symposium on Symbolic and Algebraic Computing, ACM, 1992, pp. 294-302, Washington, D.C.
Cooper, K. D., T. J. Harvey, K. Kennedy, A simple, fast dominance algorithm, Software Practice and Experience, 2001.

(Continued)

*Primary Examiner* — Andrew Wang
*Assistant Examiner* — David H Chu
(74) *Attorney, Agent, or Firm* — Lyon & Harr, L.L.P.; Craig S. Fischer

(57) ABSTRACT

An efficient symbolic differentiation method and system that automatically computes one or more derivatives of a function using a computing device. A derivative graph is used to graphically represent the derivative of a function. Repeated factorization of the derivative graph yields a factored derivative graph. The derivative is computed by summing the products along all product paths in the factored derivative graph. The efficient symbolic differentiation method and system operates on both single input/single output and multiple input/multiple output functions. For a single input/single output function, the order of the factoring does not matter. However, for a multiple input/multiple output function, the factoring order is such that the factor subgraph appearing most frequently in the derivative graph is factored first. The method and system also use a product pairs priority queue to avoid the re-computing of sub-strings that are common between product paths.

20 Claims, 16 Drawing Sheets

OTHER PUBLICATIONS

Debevec, P. E., C. J. Taylor, and J. Malik, Modeling and rendering architecture from photographs: A hybrid geometry- and image-based approach, SIGGRAPH'96 Conf. Proc., Aug. 1996, pp. 11-20, ACM SIGGRAPH, Addison Wesley.

DiffExpress for Delphi and C++ Builder: Symbolic differentiation of mathematical expressions, available at http://www.aidaim.com/products/free_components/difr_spc.php, 2000-2011.

Fang A. C., N. S. Pollard, Efficient synthesis of physically valid human motion, ACM Trans. Graph. 2003, pp. 417-426, vol. 22, No. 3.

Featherstone, R., and D. E. Orin, Robot dynamics: Equations and algorithms, IEEE Int. Conf. Robotics and Automation, 2000, pp. 826-834.

Laszlo, J., M. van de Panne, and E. Fiume, Interactive control for physically-based animation, Proc. of SIGGRAPH 2000, Jul. 23-28, 2000, New Orleans, Louisiana, pp. 201-209.

Lee, S.-H., J. Kim, F. C. Park, M. Kim, and J. E. Bobrow, Newton-type algorithms for dynamics-based robot movement optimization, IEEE Transactions on Robotics, Aug. 2005, pp. 657-667, vol. 21, No. 4.

Levoy, M., P. Hanrahan, Light field rendering, Proceedings of the 23rd Annual Conf. on Comp. Graphics and Interactive Techniques, 1996, pp. 31-42.

Liu, Z., S. J. Gortler, and M. F. Cohen, Hierarchical spacetime control, SIGGRAPH'94 Conf. Proc., Aug. 1994, pp. 35-42.

Liu K. C., A. Hertzmann, Z. Popovic, Learning physics-based motion style with nonlinear inverse optimization, ACM Trans. Graph., Jul. 2005, pp. 1071-1081, vol. 24, No. 3.

The Mathematica Book Online, A Practical Introduction to Mathematics, Symbolic Mathematics, Sec. 1.5.2 Differentiation, 2011.

Sloan, P., B. Luna, J. Snyder, Local, deformable precomputed radiance transfer, ACM Trans. Graph., Jul. 2005, pp. 1216-1224, vol. 24, No. 3.

Snavely, N., S. M. Seitz, R. Zeliski, Photo tourism: Exploring photo collections in 3D, ACM Transactions on Graphics (SIGGRAPH Proc., 2006, pp. 835-846, vol. 25, No. 3.

Ulery, D. L., H. M. Khalil, Symbolic/numeric algorithms for partial differential equations, Proc. of the third ACM Symposium on Symbolic and Algebraic Computation, 1976, pp. 377-381, Yorktown Heights, New York, United States.

Witkin A., M. Kass, Spacetime constraints, Computer Graphics (Proceedings of SIGGRAPH 88), Aug. 1988, pp. 159-168, vol. 22, No. 4.

* cited by examiner

DERIVATIVE GRAPH

PRODUCT PATH 1

PRODUCT PATH 2

$f^0{}_0 =$  +

FACTOR SUB-GRAPH [3,0]
FACTOR SUB-GRAPH [0,3]

FACTOR SUB-GRAPH [3,1]

FACTOR SUB-GRAPH [0,2]

FACTOR SUB-GRAPH [0,2]

FACTOR SUB-GRAPH [0,2] REPLACED WITH EDGE SUB-GRAPH $d_7$

EDGE SUB-GRAPH $d_7$

FACTOR
SUB-GRAPH [0,3]

FACTOR SUB-GRAPH [0,3]
REPLACED WITH EDGE
SUB-GRAPH $d_8$

EDGE SUB-GRAPH $d_8$

FACTOR
SUB-GRAPH [3,1]

FACTOR SUB-GRAPH [3,1]
REPLACED WITH EDGE
SUB-GRAPH $d_7$

EDGE SUB-GRAPH $d_7$

FACTOR
SUB-GRAPH [3,0]

FACTOR SUB-GRAPH [3,0]
REPLACED WITH EDGE
SUB-GRAPH $d_8$

EDGE SUB-GRAPH $d_8$

EFFICIENT SYMBOLIC DIFFERENTIATION USING DERIVATIVE GRAPH FACTORIZATION

BACKGROUND

Derivatives are essential in a variety of fields and applications. By way of example, one such field is computer graphics, where derivatives are used for global illumination optimization, dynamics problems, and comparing surface normals and curvature. In general, derivatives may be computed either manually or automatically. Manual differentiation is so tedious and error prone that it only is used for the simplest of problems. In the majority of cases, the derivative is computed using automatic techniques running on a computing device. There are at least three automatic techniques for computing derivatives, including finite differencing, automatic differentiation, and symbolic differentiation.

The finite difference technique approximates the derivative by computing differences. However, because it is so inaccurate and inefficient as compared to other techniques, it is used rarely. Automatic differentiation is a technique for evaluating a function and its derivative simultaneously. There are two basic forms of automatic differentiation: forward and reverse. Reverse automatic differentiation works well on functions that have multiple inputs and only one output. In this situation, however, forward automatic differentiation is inefficient. The inverse is also true: for functions having one input and multiple outputs, forward automatic differentiation is efficient but reverse automatic differentiation is inefficient. In order to avoid inefficient automatic differentiation, depending on the type of function a user is required to specify either forward or reverse automatic differentiation. This requirement increases the complexity and decreases the speed of the automatic differentiation process. In addition, neither forward nor reverse automatic differentiation works efficiently for functions having multiple inputs and multiple outputs.

Symbolic differentiation has traditionally been the domain of expensive and proprietary math systems (such as Mathematica®). These systems can compute efficient derivatives for simple functions. However, as the size and complexity of the function increases so does the computation time and memory necessary to compute its derivative. This means that for some functions using a symbolic differentiation technique causes the computing device to exhausts its memory (meaning that the derivative cannot be computed at all) or that the symbolic differentiation technique takes an inordinate amount of time to compute the derivative.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The efficient symbolic differentiation method and system automatically computes one or more derivatives of a function using a computing device. The efficient symbolic differentiation method and system works both for single input/single output functions and for multiple input/multiple output functions. The method and system utilize a derivative graph that graphically represents the derivative of a function. The derivative graph is repeatedly factored to generate a factored derivative graph and, in the case of a multiple input/multiple output function, product terms are grouped into sub-expressions. In this manner, the special nature of the derivative graph is exploited to efficiently and quickly compute derivatives by summing the products along all product paths in the factored derivative graph.

The method begins by representing the function to be differentiated by an expression graph. From this expression graph a derivative graph is generated. The derivative graph is a graphical way to represent the traditional chain rule of differentiation. The method factors out common factors in the derivative graph and identifies common product sub-sequences to reduce redundancy. Factoring the derivative graph can yield a plurality of subgraphs, thereby collapsing multiple edges of a subgraph into a single edge. The subgraphs also may be factored further into additional subgraphs until no additional factoring is possible. What then remains after this factoring is a factored derivative graph. In some cases, after factoring each of the edges in the original derivative graph collapse into a single edge. The derivative of the function represented then is computed as the sum of the products along all product paths in the factored derivative graph.

The efficient symbolic differentiation method is not only faster that existing automatic techniques, but is asymptotically better. This means that as the size and complexity of the function being differentiated increases the method becomes more efficient, as compared to existing techniques. This allows the differentiation of functions using the efficient symbolic differentiation method that previously could not be differentiated using existing automatic techniques.

In one embodiment the function to be differentiated has a single input and a single output. The optimal factorization of the derivative graph is found by using a dominator technique to find a dominator node in the graph. Everything between the dominator including the node that is dominated is a factorable subgraph. Once the derivative graph is fully factored, the graph collapses to a single edge factored derivative graph.

In another embodiment the function to be differentiated has multiple inputs and multiple outputs. This means that derivative graphs may share subgraphs. In this embodiment, the efficient symbolic differentiation method avoids re-computing information for shared subgraphs by generating a factorization priority queue. The subgraph occurring most frequently is placed first in the queue. The other subgraphs in the queue are ordered according to their frequency of occurrence. The derivative graph is factored in this manner until there are no factorable subgraphs remaining in the factorization priority queue.

In another embodiment for differentiating a function having multiple inputs and outputs, the efficient symbolic differentiation method uses a product pairs priority queue. The product pairs priority queue contains product path pairs that are shared by derivative graphs for the function. This avoids the re-computing of sub-strings that are common between product paths. In this embodiment, a subgraph is analyzed to determine the number of paths going through each of the product pairs. This represents the number of times the product pair was used. These product pairs are placed in the product pairs priority queue and ordered such that the most frequently used product pair is first in the queue. The other products pairs similarly are ordered in the queue according to there usage frequency. Each product pair also is given a new variable name and stored in memory so that re-computation is avoided. The product pairs priority queue is continually updated until the subgraph collapses into a single edge.

It should be noted that alternative embodiments are possible, and that steps and elements discussed herein may be changed, added, or eliminated, depending on the particular embodiment. These alternative embodiments include alternative steps and alternative elements that may be used, and structural changes that may be made, without departing from the scope of the invention.

DRAWINGS DESCRIPTION

Referring now to the drawings in which like reference numbers represent corresponding parts throughout:

Figure 9:
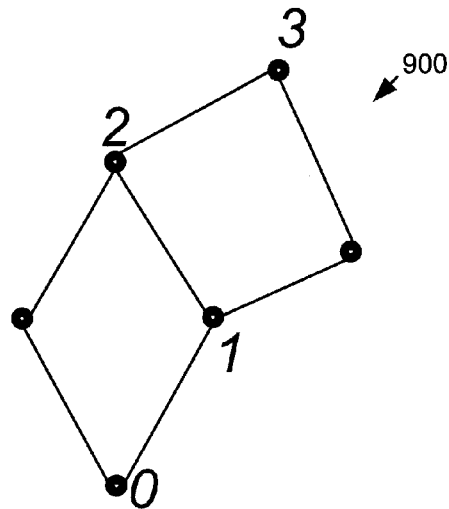

FIG. 9 contains a derivative graph which illustrates a dominance and a postdominance relationship.

Figure 10:
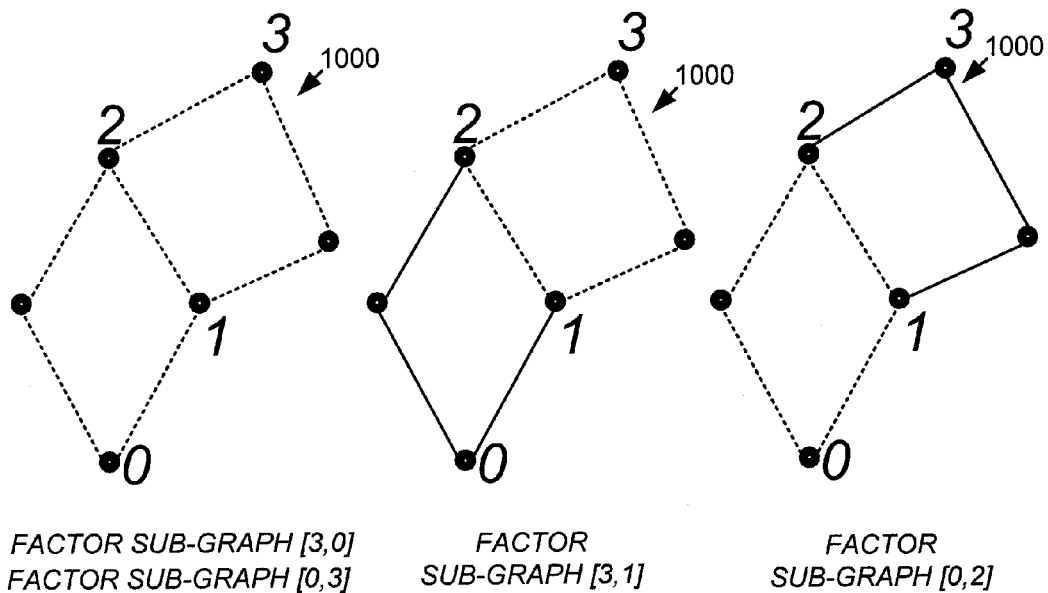

FIG. 10 illustrates the factor subgraphs of the derivative graph shown in FIG. 9.

Figure 11:
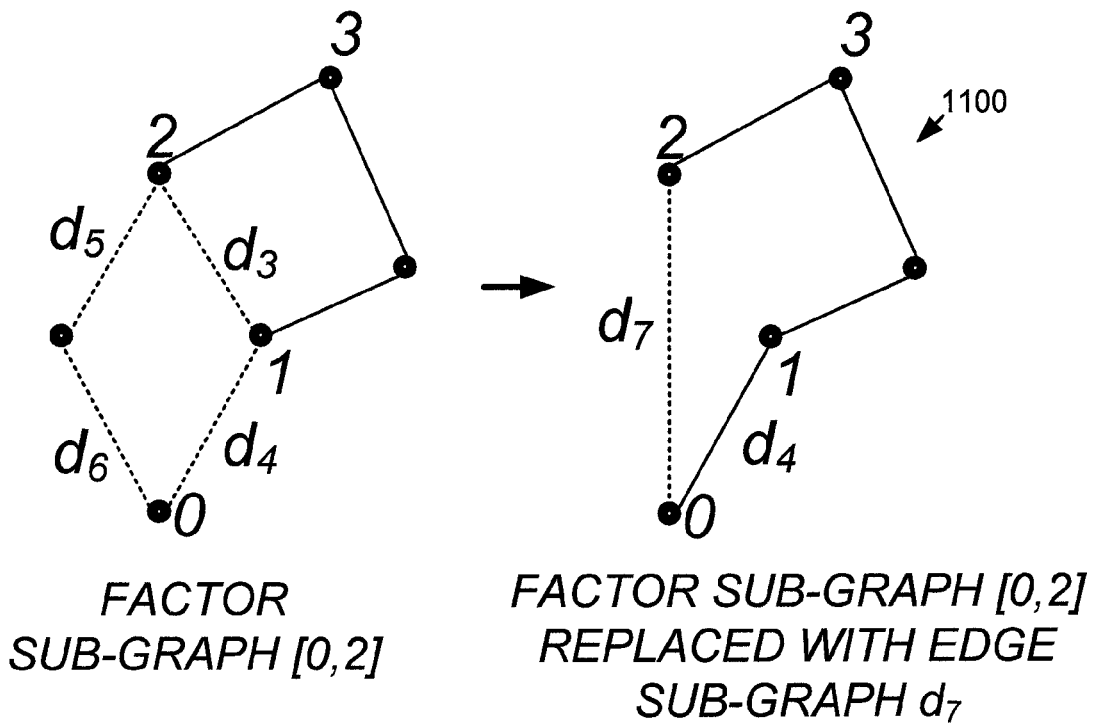

FIG. 11 is a first example of the first embodiment of the efficient symbolic differentiation method and system illustrating the factoring of factor subgraph [0,2] shown in FIG. 10.

Figure 12:
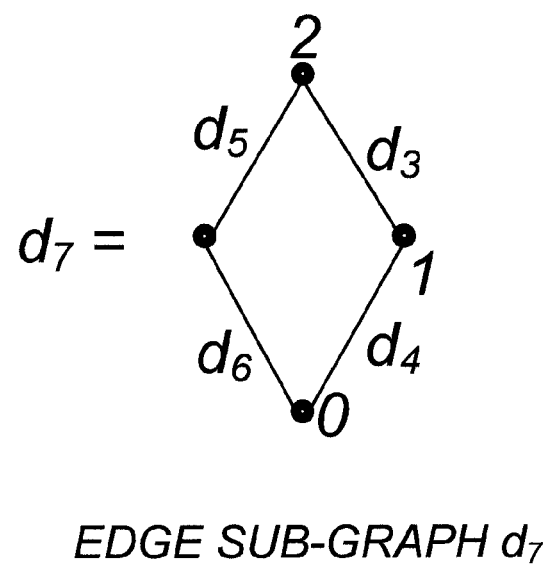

FIG. 12 illustrates an edge subgraph that was factored out of the graph shown in FIG. 11.

Figure 13:
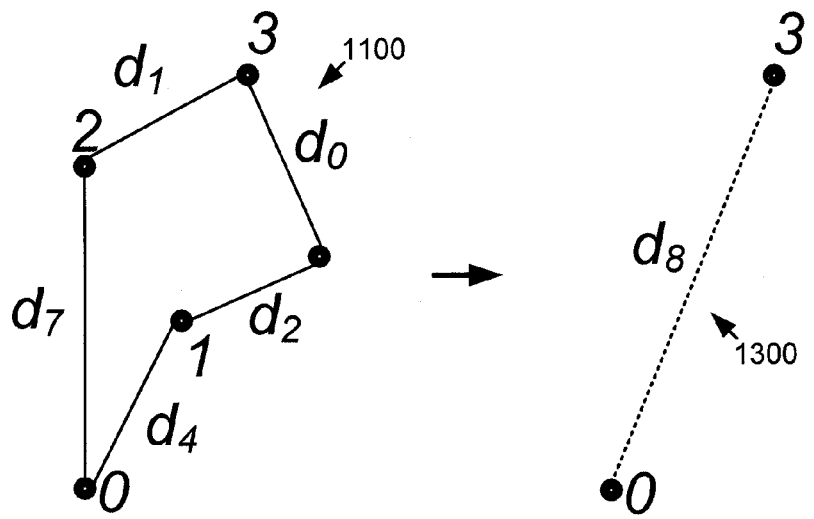

FIG. 13 illustrates the factor subgraphs for the new derivative graph generated in FIG. 11.

Figure 14:
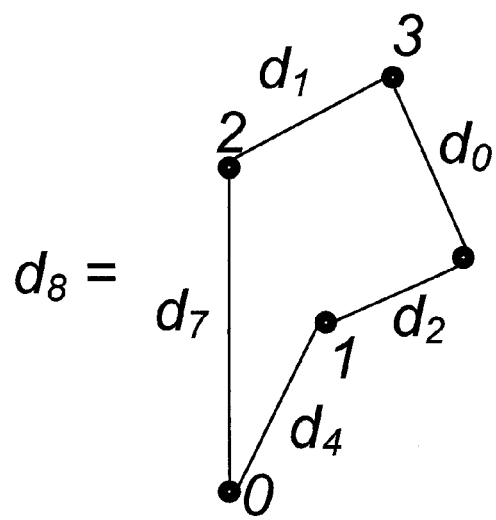

FIG. 14 illustrates an edge subgraph that was factored out of the graph shown in FIG. 13.

Figure 15:
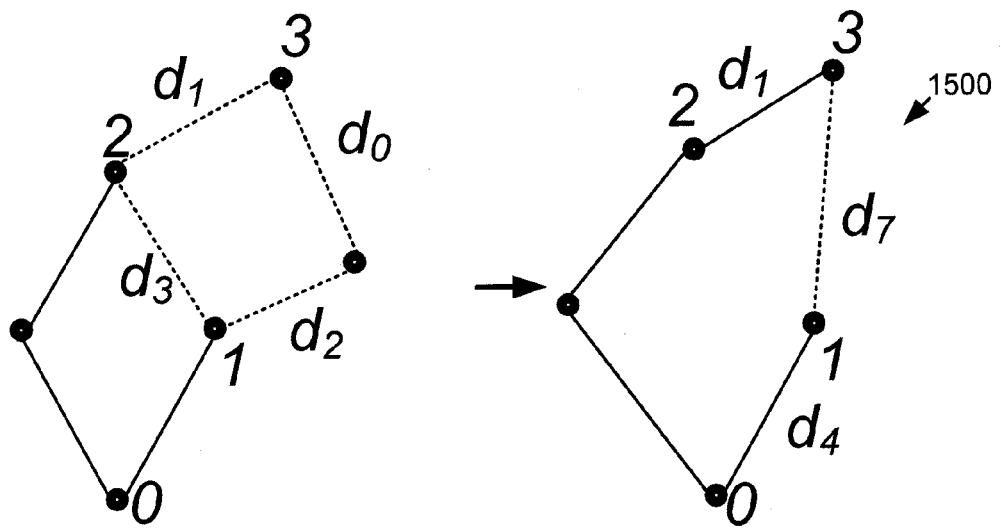

FIG. 15 is a second example of the first embodiment of the efficient symbolic differentiation method and system illustrating the factoring of factor subgraph [3,1] shown in FIG. 10.

Figure 16:
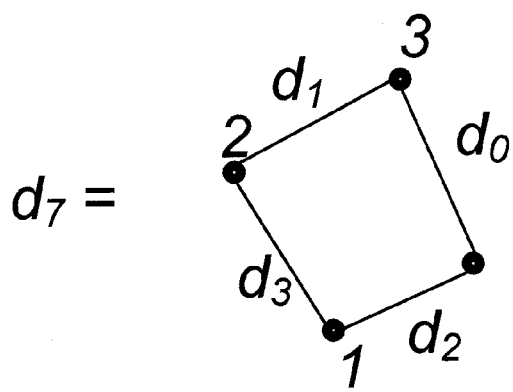

FIG. 16 illustrates an edge subgraph that was factored out of the graph shown in FIG. 15.

Figure 17:
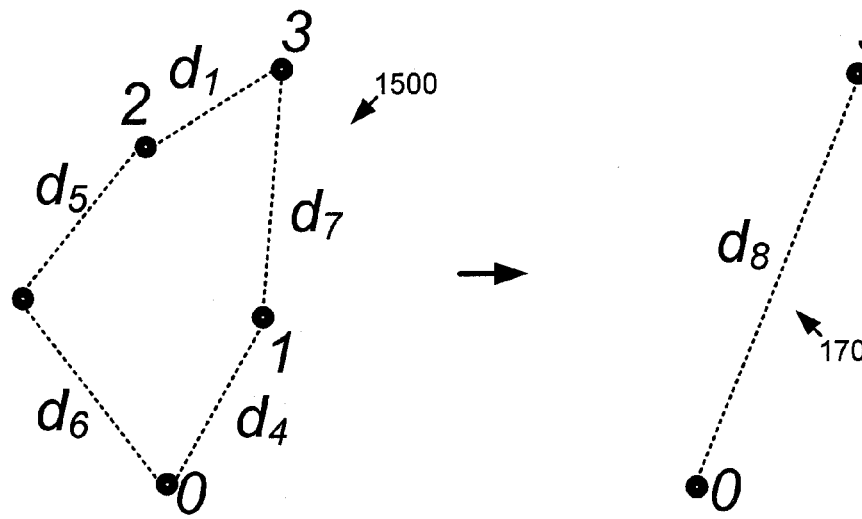

FIG. 17 illustrates the factor subgraph [3,0] for the derivative graph generated in FIG. 15

Figure 18:
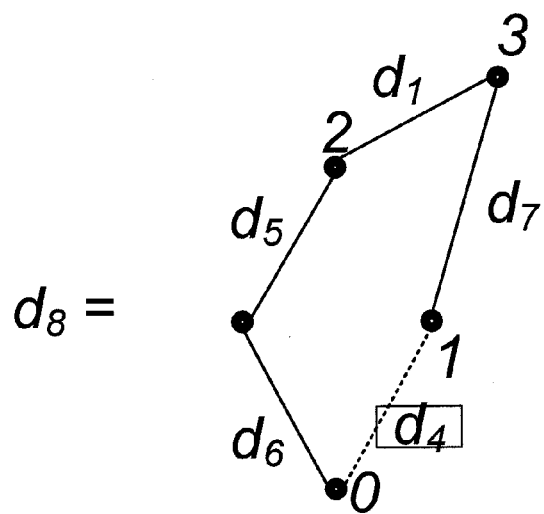

FIG. 18 illustrates an edge subgraph that was factored out of the derivative graph shown in FIG. 17.

Figure 19:
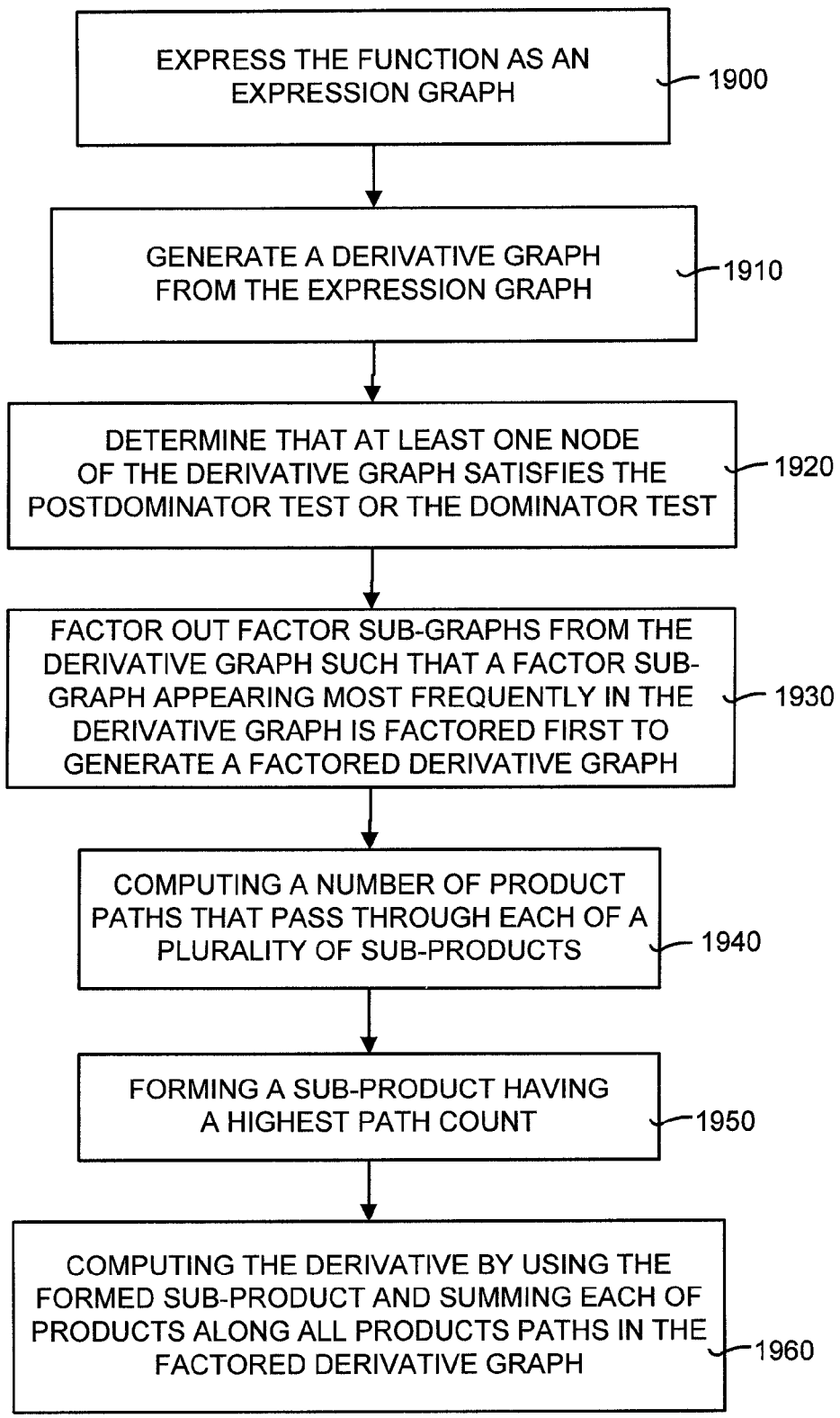

FIG. 19 is a general flow diagram illustrating the second embodiment of the efficient symbolic differentiation method.

Figure 20:
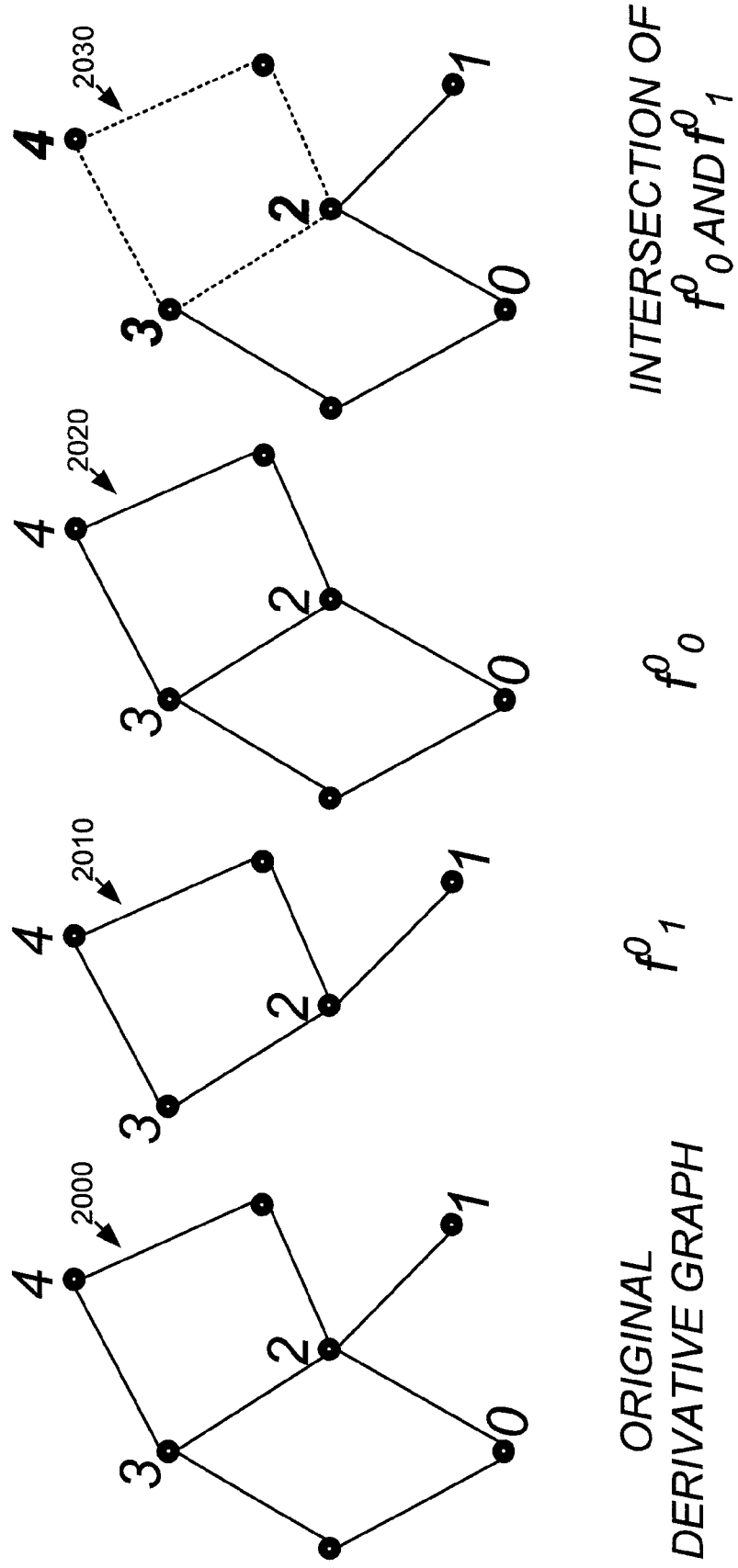

FIG. 20 illustrates a first example of the importance of the factor subgraph factoring order for the second embodiment of the efficient symbolic differentiation method.

Figure 21:
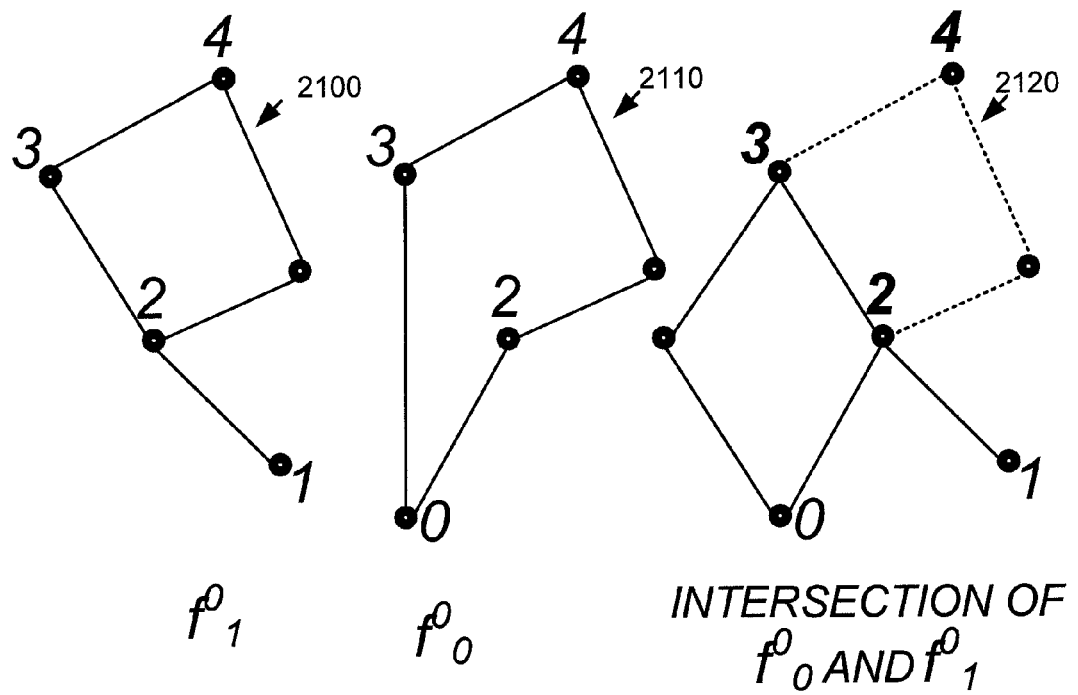

FIG. 21 illustrates a second example of the importance of the factor subgraph factoring order for the second embodiment of the efficient symbolic differentiation method.

Figure 22:
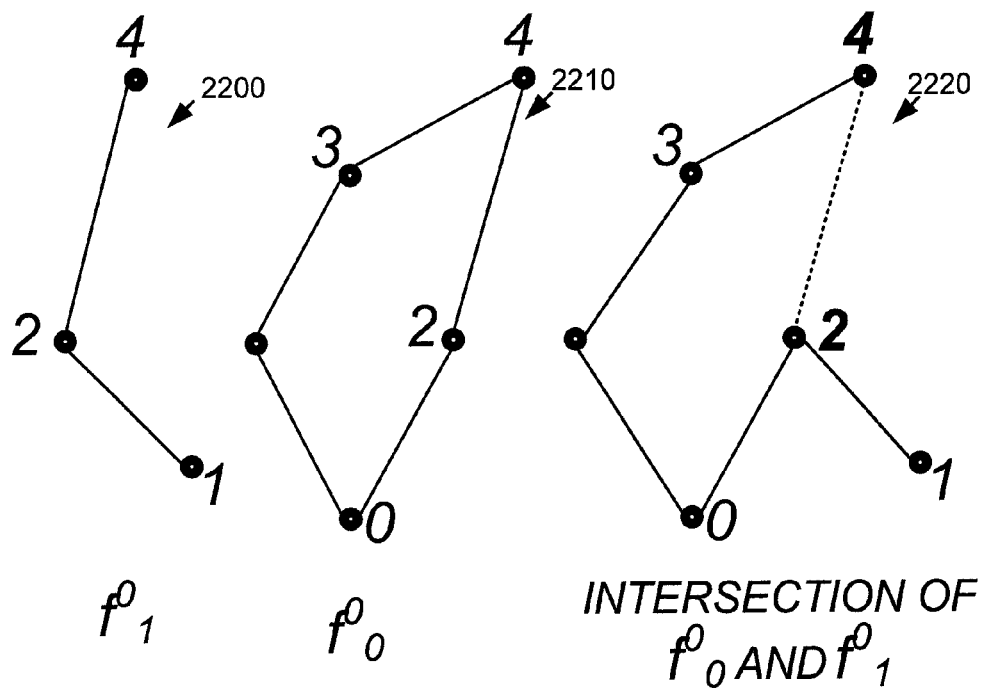

FIG. 22 illustrates a third example of the importance of the factor subgraph factoring order for the second embodiment of the efficient symbolic differentiation method.

Figure 23:
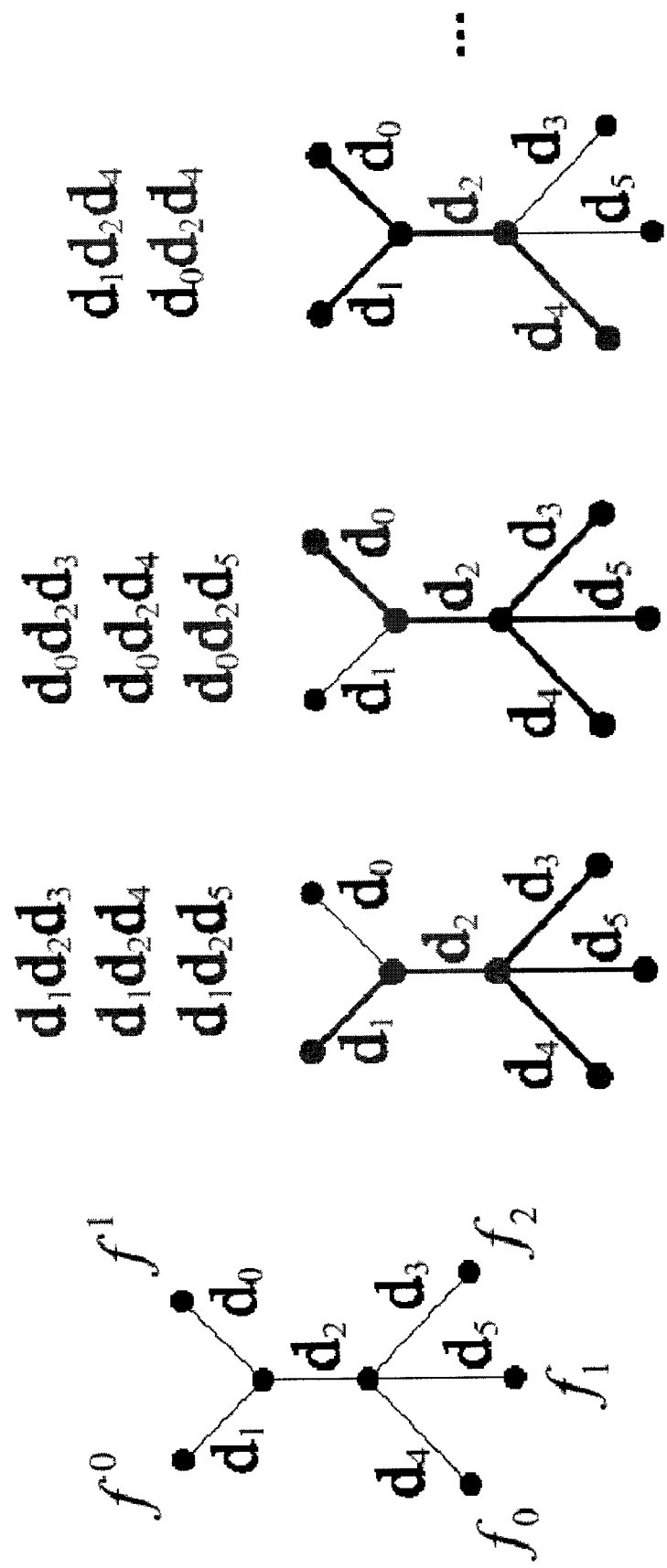

FIG. 23 is an example illustrating the problem of how to best form path products after all factorizations have been performed for a multiple input/multiple function.

Figure 24:
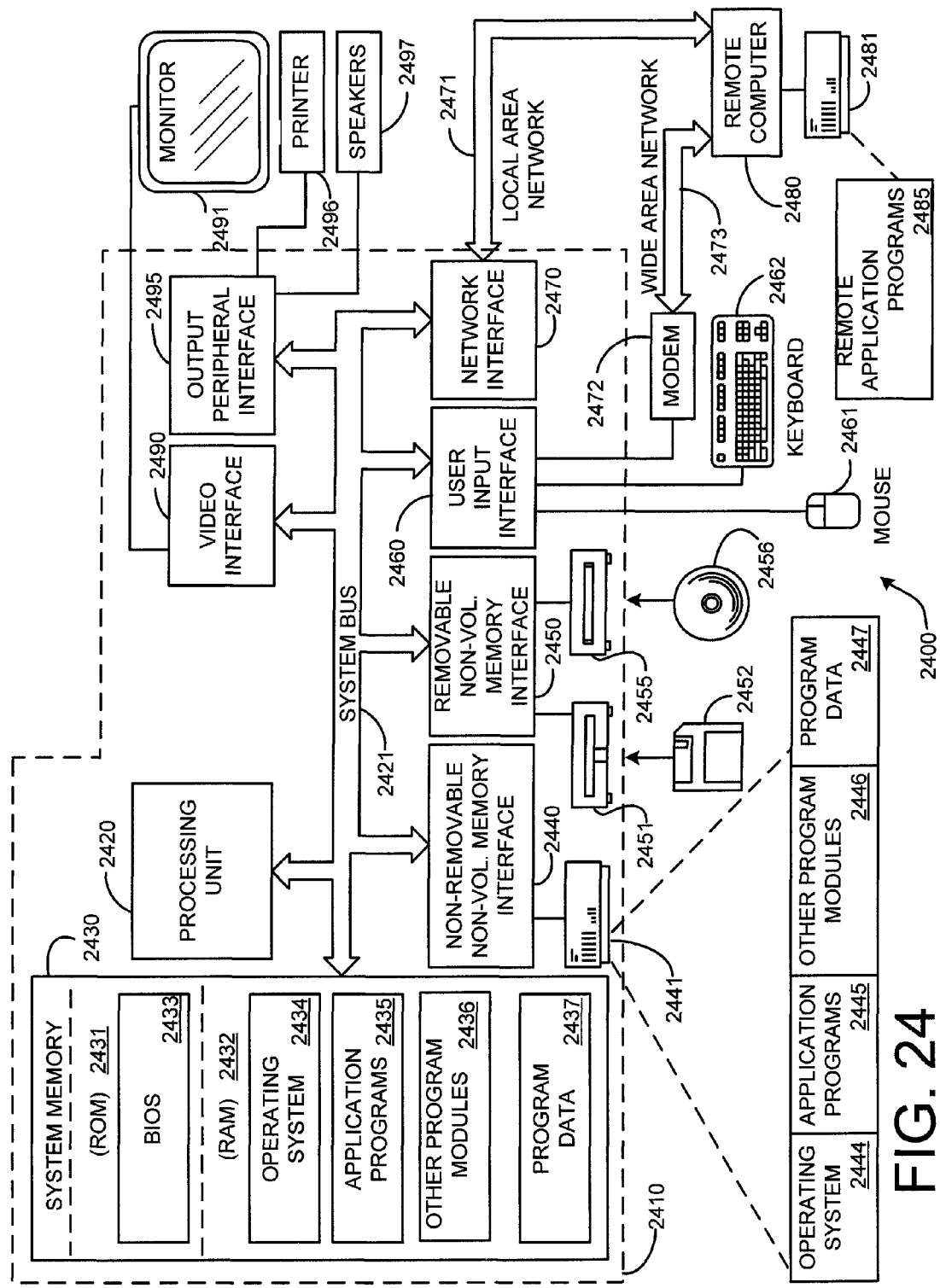

FIG. 24 illustrates an example of a suitable computing system environment in which the efficient symbolic differentiation method and system may be implemented.

DETAILED DESCRIPTION

In the following description of the efficient symbolic differentiation method and system, reference is made to the accompanying drawings, which form a part thereof, and in which is shown by way of illustration a specific example whereby the efficient symbolic differentiation method and system may be practiced. It is to be understood that other embodiments may be utilized and structural changes may be made without departing from the scope of the claimed subject matter.

I. Operational and System Overview

Figure 1:
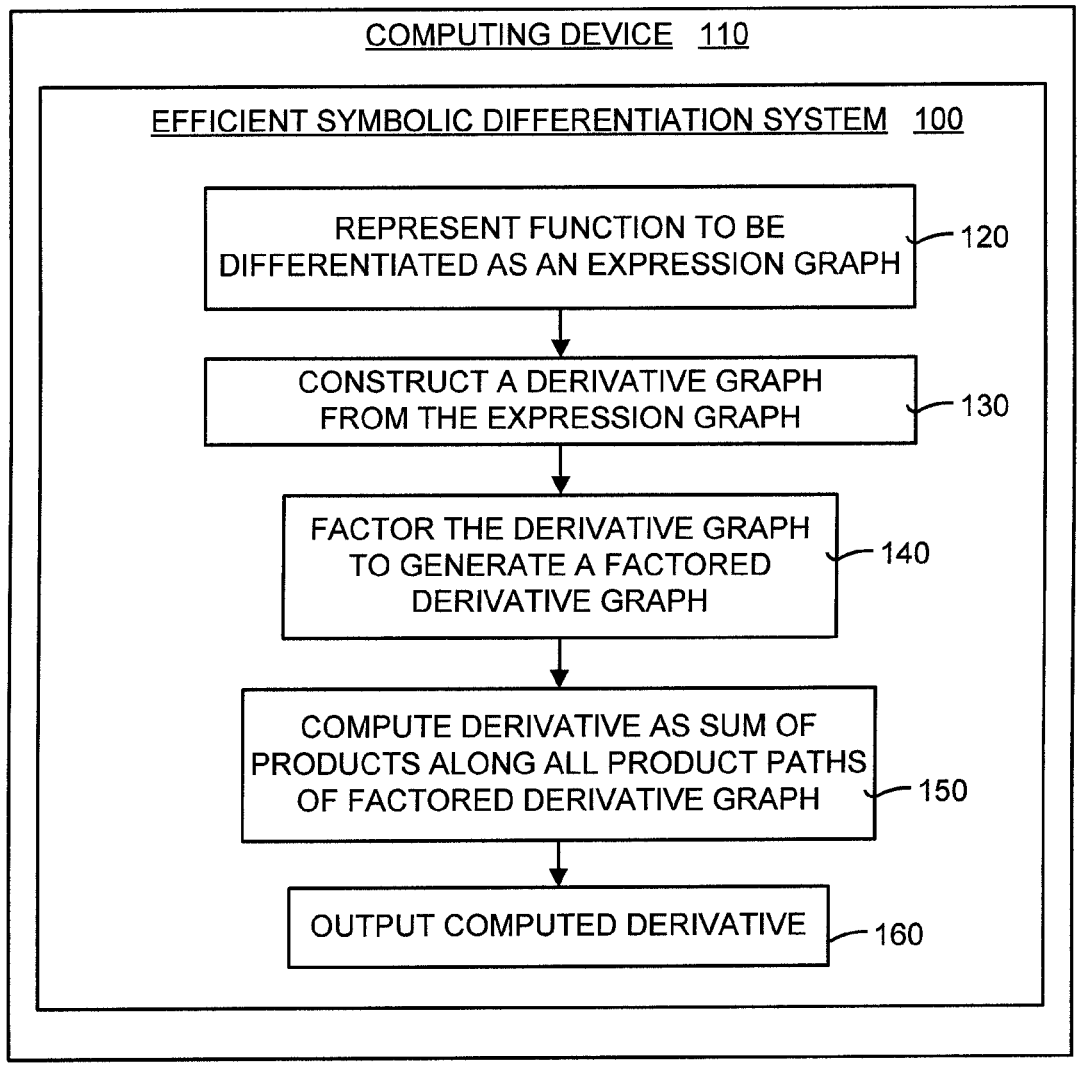
FIG. 1 is a block/flow diagram illustrating the general operation of the efficient symbolic differentiation method and system disclosed herein.

FIG. 1 is a block/flow diagram illustrating the general operation of the efficient symbolic differentiation method and system disclosed herein. It should be noted that FIG. 1 is merely one of several ways in which the efficient symbolic differentiation method and system may be implemented and used. Referring the FIG. 1, the efficient symbolic differentiation method is shown embodied in an efficient symbolic differentiation system 100 located on a computing device 110. The efficient symbolic differentiation method may be implemented on various types of computing devices, such as on a central processing unit (CPU) or multi-core processing systems.

The efficient symbolic differentiation method begins by representing a function to be differentiated as an expression graph (box 120). Next, a derivative graph is constructed from the expression graph (box 130). The derivative graph then is factored, as described below, to generate a factored derivative graph (box 140). The derivative of the function then is computed by summing the products along each of the possible product paths in the factored derivative graph (box 150). As explained below, a product path is a path from an input node to an output node whereby each of the functions is multiplied with each other to obtain a product. Each resultant product along each of the possible paths then is summed to obtain the derivative. Finally, the computed derivative is output for use by applications, such as graphics applications (box 160).

II. Operational Details

The efficient symbolic differentiation method and system computes derivatives of a function by representing the chain rule of differentiation as a sum of path products using a derivative graph. The derivative graph is constructed from an expression graph of a function to be differentiated. In the expression graph, nodes represent functions and edges represent function compositions. For example, a node having the function "sin" and an edge that connects it to "a" would mean compose the function "sin" with "a" (i.e., sin(a)). The concept of the expression graph is known by those having ordinary skill in the art, and will not be described in further detail.

In some ways the derivative graph resembles the expression graph. For example, the structure of the derivative graph and the expression graph is the same. In other words, the number of nodes, edges, and the interconnection between the nodes and edges remains unchanged. However, there are important differences between the derivative graph and the expression graph. For example, in the derivative graph edges represent partial derivatives. In other words, an edge on the derivative graph is one partial derivative of a function with respect to this argument of that function. Moreover, the nodes of the derivative graph only are used to connect edges. No operations occur at the nodes of the derivative graph. The efficient symbolic differentiation method and system uses the derivative graph to express the chain rule as the sum over all paths through the derivative graph from a certain node that is having its derivative computed with respect to whatever node the derivative is being taken.

In general, to compute a derivative using the derivative graph all possible paths down the graph are taken. These paths are called "product paths", since the terms along each path are multiplied to obtain an intermediate result. The derivative is found by summing each of the results for each possible product path. Thus, if there are two possible product paths, for a first path each of the partial derivatives down the first path are multiplied together to obtain a first intermediate result. Similarly, as the second product path is traversed each of the partial derivatives is multiplied to obtain a second intermediate result. The derivative is found by summing each of the product paths. In other words, the product of the first path (or the first intermediate result) and the product of the second path (or the second intermediate result) are summed to compute the desired derivative.

The Derivative Graph

The following two examples illustrate the concept of the derivative graph. To minimize clutter in the figures the following notation is used. A function can be represented as $f: \mathbb{R}^n \to \mathbb{R}^m$, meaning that the function $f$ has n input and m outputs. A function $f$ having a single input/single output can be represented as $f: \mathbb{R}^1 \to \mathbb{R}^1$. A function $f$ having multiple inputs/multiple outputs can be represented as $f: \mathbb{R}^n \to \mathbb{R}^m$, where n and m are greater than one. For $f: \mathbb{R}^n \to \mathbb{R}^m$, the derivative of $f$ is represented as $f^i_j$, which is the derivative of the ith range element with respect to the jth domain element. Range and domain indices start at 0. If there is no superscript index, then the derivative is taken with respect to all range elements. Higher order derivatives are indicated by additional subscript indices.

Figure 2:
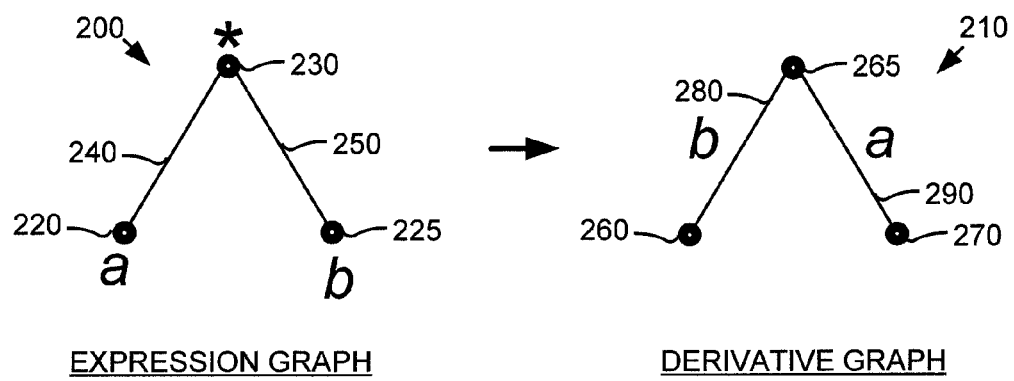
FIG. 2 illustrates a simple first example of a derivative graph used by the efficient symbolic differentiation method and system shown in FIG. 1.

FIG. 2 illustrates a first example of a derivative graph for a relatively simple function, $f=ab$. As shown in FIG. 2, the function is represented by an expression graph 200 and its corresponding derivative graph 210. There are three nodes in the expression graph 200, namely an "a" node 220 representing the term "a", a "b" node 225 representing the term "b", and a "*" node 230 representing a multiplication operation. In addition, the expression graph 200 contains a first edge 240 connecting the "*" node 230 and the "a" node 220, and a second edge 250 connecting the "*" node 230 and the "b" node 225.

The derivative graph 210 contains a first node 260, a second node 265, and a third node 270. However, as stated above, these nodes are only are used to connect edges and no operations occur at the nodes 260, 265, 270 of the derivative graph 210. The first edge 240 connecting the "*" node 230 and the "a" node 220 in the expression graph 200 corresponds to a third edge 280 represents the partial derivative $\partial ab/\partial a = b$ in the derivative graph 210. Similarly, the second edge 250 connecting the "*" node 230 and the "b" node 225 in the expression graph 200 corresponds to a fourth edge 290 representing the partial derivative $\partial ab/\partial b = a$ in the derivative graph 210.

Figure 3:
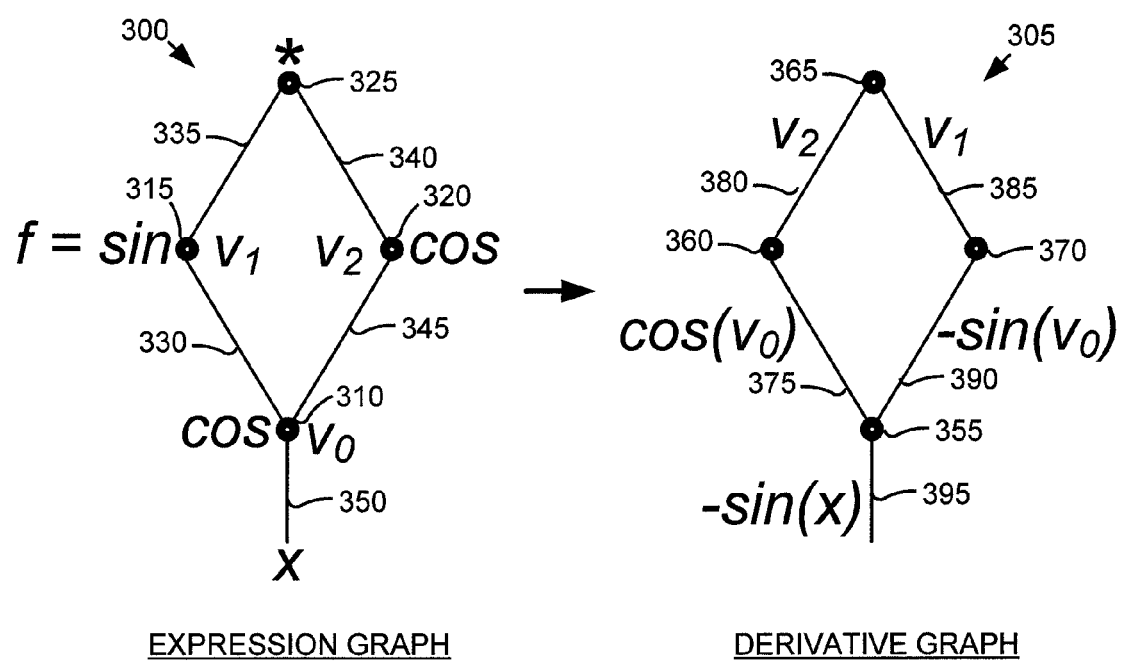
FIG. 3 illustrates a second example of a derivative graph having a more complicated function than shown in FIG. 2.

FIG. 3 illustrates a second example of the derivative graph for a more complicated function than shown in FIG. 2. This function is $f=\sin(\cos t(x))*\cos(\cos(x))$. This function is represented in FIG. 3 by an expression graph 300. To minimize clutter in the corresponding derivative graph 305, the nodes in the expression graph 300 have been given labels $v_i$. The following labels are used in FIG. 3:

$v_0 = \cos(x)$ $v_1 = \sin(\cos(x)) = \sin(v_0)$ $v_2 = \cos(\cos(x)) = \cos(v_0)$.

In other words, the expression graph 300 contains a "$v_0$" node 310 representing the term "$v_0 = \cos(x)$", a "$v_1$" node 315 representing the term "$v_1 = \sin(\cos(x)) = \sin(v_0)$", a "$v_2$" node 320 representing the term "$v_2 = \cos(\cos(x)) = \cos(v_0)$", and a "*" node 325 representing a multiplication operation. In addition, the expression graph 300 also contains a first edge 330 connecting the "$v_0$" node 310 and the "$v_1$" node 315, a second edge 335 connecting the "$v_1$" node 315 and the "*" node 325, a third edge 340 connecting the "*" node 325 and the "$v_2$" node 320, a fourth edge 345 connecting the "$v_2$" node 320 and the "$v_0$" node 310, and a fifth node 350 emanating from the "$v_0$" node 310.

The derivative graph 305 contains a first node 355, a second node 360, a third node 365, and fourth node 370. The derivative graph also contains a sixth edge 375, a seventh edge 380, an eighth edge 385, a ninth edge 390, and a tenth edge 395. In order to compute the derivative ($f^0_0$) for the function shown in FIG. 3, the sum of all product paths on the derivative graph 310 is computed. Each term along a product path is computed to arrive at an intermediate result, and then the intermediate results from each of the product paths are summed to arrive at the derivative ($f^0_0$) for the function.

Figure 4:
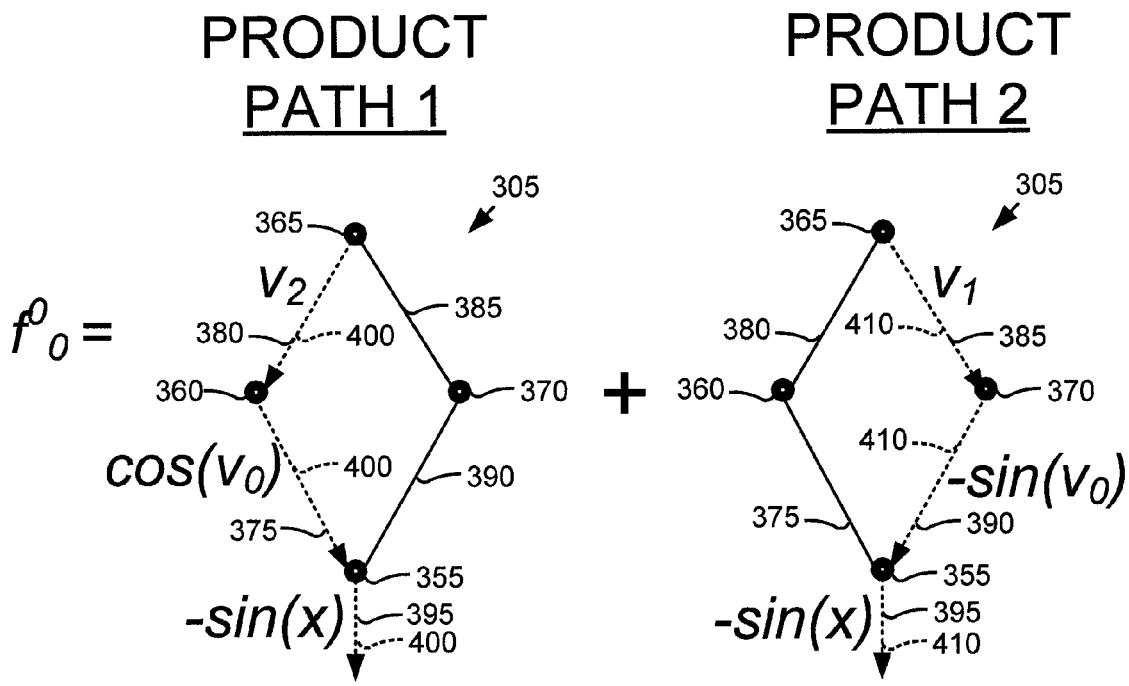
FIG. 4 illustrates the computation of summing all product paths on the derivative graph shown in FIG. 3.

FIG. 4 illustrates the concept of product paths and how the derivative of the function shown in FIG. 3 is computed by summing all product paths on the derivative graph. A product path is a path from the input to the output on the derivative graph 305. Using the efficient symbolic differentiation method and system to compute the derivative ($f^0_0$), first the method computes the product of all the edge terms along Path 1 (400). Path 1 (400) is shown on the left side of FIG. 4 by the dotted line. The first intermediate result obtained from computing the products of Path 1 (400) is $v_2 \cos(v_0)(-\sin(x))$. Next, the method computes the product of all the edge terms along Path 2 (410). Path 2 (410) is shown on the right side of FIG. 4 by the dotted line. The second intermediate result obtained from computing the products of Path 2 (410) is $v_1(-\sin(v_0))(-\sin(x))$. The method then sums the results of the two product paths to compute the derivative, and the result is:

$$f^0_0 = v_2\cos(v_0)(-\sin(x)) + v_1(-\sin(v_0))(-\sin(x))$$
$$= \cos(\cos(x))\cos(\cos(x))(-\sin(x)) + \sin(\cos(x))(-\sin(\cos(x)))$$
$$(-\sin(x)).$$

This is the mathematic representation of the derivative of the function represented by the expression graph 300 shown in FIG. 3. Since there are only two product paths for the derivative graph 305 of FIGS. 3 and 4, the first and second intermediate results are the results that were summed. Had there been additional product paths, the intermediate results for all products paths would have been summed to compute the derivative ($f^0_0$).

Factoring the Derivative Graph

Figure 5:
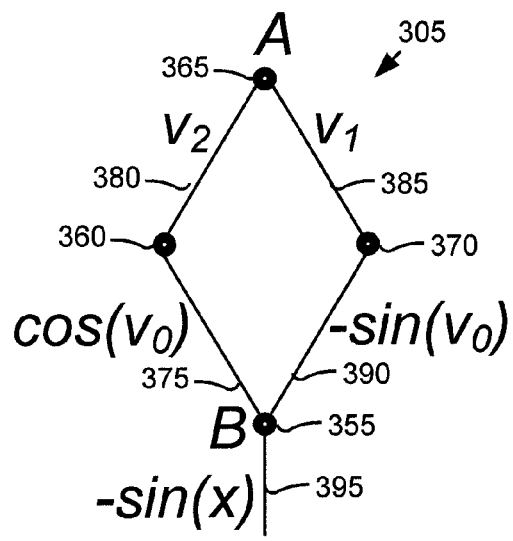
FIG. 5 illustrates the concept of factorization of the derivative graph shown in FIGS. 3 and 4.

It can be seen from the previous discussion that the sum of the product paths has redundant computations of common factors and common product sub-sequences. Referring again to FIG. 4, each branching of the derivative graph 305, either upward or downward, corresponds to a factorization of the expression. FIG. 5 illustrates this concept. In FIG. 5, the derivative graph 305 of FIGS. 3 and 4 is shown. As can be seen in FIG. 5, the third node 365 a first branch node (denoted by "A") and the first node 355 is a second branch node (denoted by "B"). All product paths that pass through the second branch node "B" will include −sin(x) as a factor. Each branching of the derivative graph 305 corresponds to a factorization of the derivative being computed. If the product paths, Path 1 (400) and Path 2 (410), are collapsed into a single edge that groups the terms that share the term −sin(x) as a factor, then the factored derivative graph 600 as shown in FIG. 6 is the result.

Figure 6:
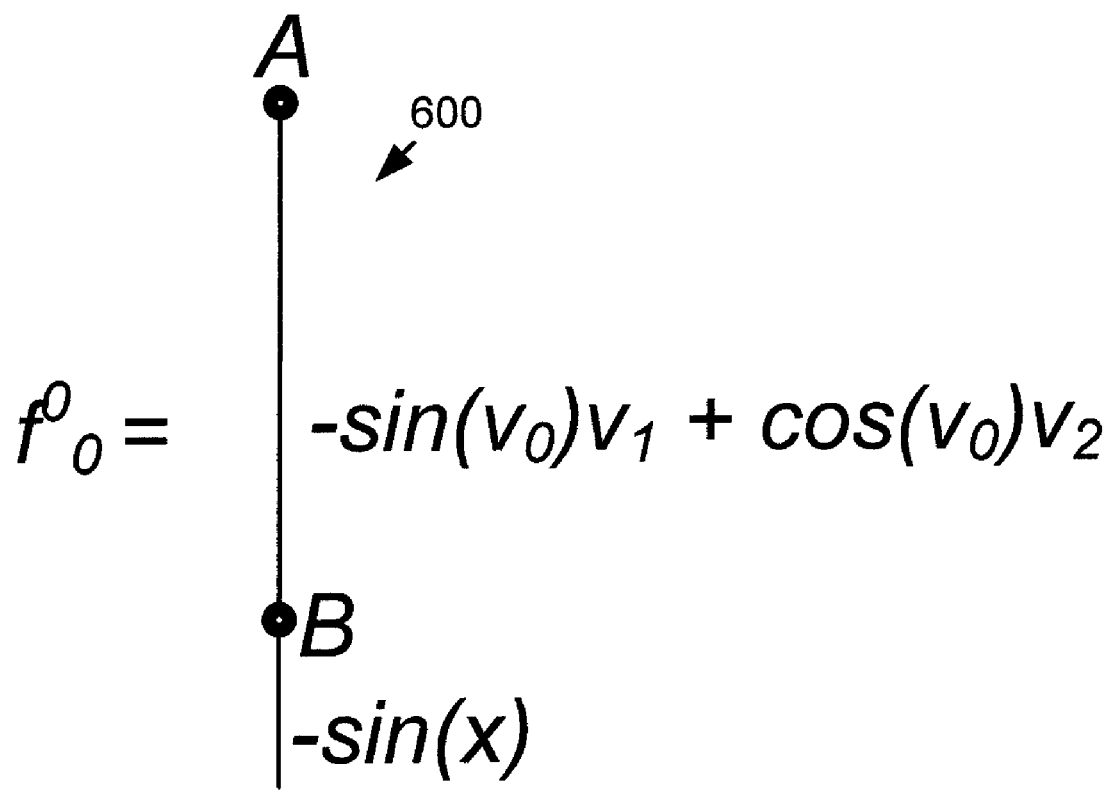
FIG. 6 illustrates the factored derivative graph that is the result of collapsing the two product paths shown in FIG. 4 into a single edge.

FIG. 6 illustrates the mathematical equivalent of summing the two product paths, Path 1 (400) and Path 2 (410), shown in FIG. 4, except that there is a single product path where before there were two. Thus, in FIG. 6, factoring out the terms that share −sin(x) reduces the number of paths from the two product paths shown in FIG. 4 to the single product path shown in FIG. 6. In general, factoring the product paths in the derivative graph 305 will reduce the number of product paths from exponential to linear in the number of edges. In the original derivative graph 305 each branching doubles the number of product paths. The factored graph subgraphs can still have branches but because all of the different products along those branches are summed these branches do not multiply the number of possible paths through the graph. In the worst case there could be a graph with n branches each of which goes directly from the root to the leaf. This means that the number of paths then would be linear in the number of edges.

Factoring Functions Having a Single Input and a Single Output

The first embodiment of the efficient symbolic differentiation method and system computes derivatives for functions having a single input and a single output (single input/single output). The derivative graph for a single input/single output function can be represented mathematically by $f: \mathbb{R}^1 \to \mathbb{R}^1$, and has a single root and a single leaf. There is a potential factorization of the derivative ($f^o_0$) when two or more paths pass through the same node on the way to the root or to the leaf.

Figure 7:
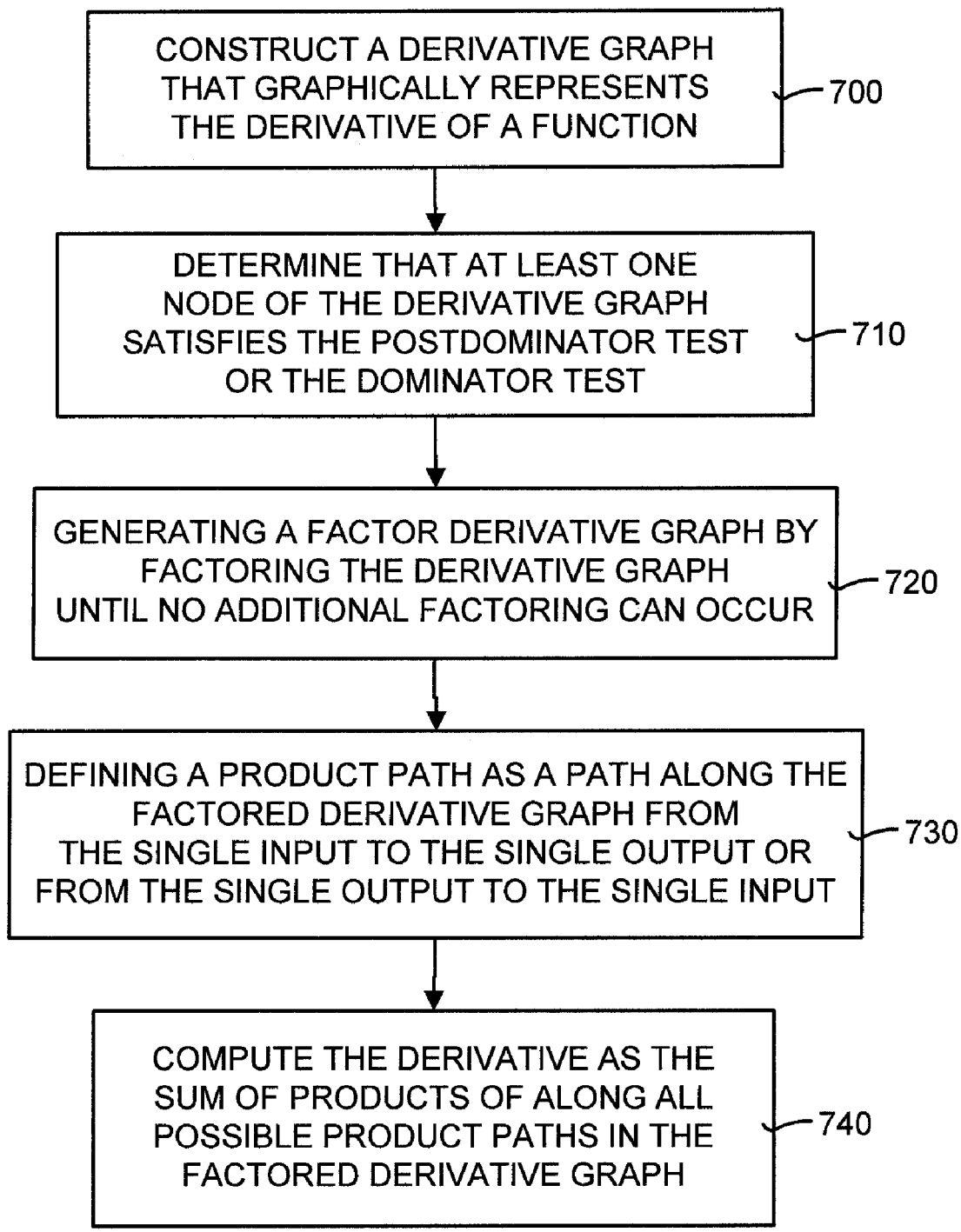
FIG. 7 is a general flow diagram illustrating the first embodiment of the efficient symbolic differentiation method.

FIG. 7 is a general flow diagram illustrating the first embodiment of the efficient symbolic differentiation method. The first embodiment of the method begins by constructing a derivative graph that graphically represents the derivative of a single input/single output function (box 700). Next, the method determines that at least one node of the derivative graph satisfies the postdominator test or the dominator test (box 710). These tests is explained in detail below and shown in implemented as the pseudocode below. In general, these tests are used to determine which nodes are to be removed when factoring. A factored derivative graph then is generated by factoring the derivative graph until no additional factoring can be performed (box 720). The method then defines a product path as a path along the factored derivative graph from the single input to the single output, or vice versa (box 730). Finally, the derivative is computed as the sum of products along all possible product paths in the factored derivative graph (box 740).

Figure 8:
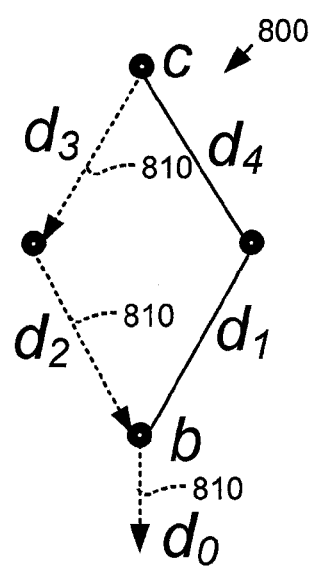
FIG. 8 illustrates the relationship between factoring and dominance.
Figure 8:
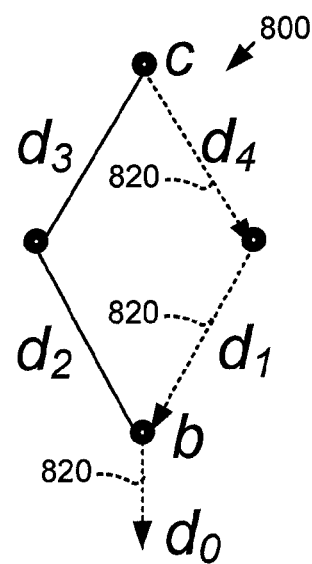

Factoring is closely related to a graph property called dominance. By way of example, FIG. 8 illustrates the relationship between factoring and dominance. As shown in FIG. 8, for a derivative graph 800, all paths from node "c" to the leaf must pass through node "b" and therefore must include the common factor $d_0$. For example, it can be noticed from FIG. 8 that there are two product paths for the derivative graph 800. Along a first product path, Path 1 (810) shown by the dotted line, going from node "c" to the leaf goes through node "b". Similarly, along a second product path, Path 2 (820) shown by the dotted line, going from node "c" to the leaf also goes through node "b".

If node "b" is on every path from node "c" to the root, then it is said that node "b" dominates node "c" (written as b dom c). This property is used in the "dominator test" in one embodiment of the efficient symbolic differentiation method shown below in pseudocode. Similarly, if node "b" is on every path from node "c" to the leaf, then it is said that node "b" postdominates (or reverse dominates) node "c" (written as b rdom c). This property is used in the "post-dominator test" in one embodiment of the efficient symbolic differentiation method, also shown below in pseudocode. Both the dominator test and the post-dominator test are used to determine which nodes are to be removed when factoring. In FIG. 8, it can be seen that node "b" reverse dominates node "c" such that all paths from node "c" to the leaf must include the common term $d_0$, which can be factored out.

Factorable subgraphs are defined by a dominator or a postdominator node at a branch in the graph. If a dominator node "b" has more than one child, or if a postdominator node "b" has more than one parent, then node "b" is called a factor node. If node "c" is dominated by a factor node "b" and has more than one parent, then node "c" is called a factor base of node "b". A factor subgraph, [b,c], includes a factor node "b", a factor base c of node "b", and those nodes on any path from node "b" to node "c".

FIG. 9 illustrates a dominance and postdominance relationship. As shown in FIG. 9, a derivative graph 900 has node 0, node 1, node 2, and node 3. Node 0 postdominates nodes 1, 2 and 3 (0 rdom {1, 2, 3}), but node 2 does not dominate node 0. Moreover, node 3 dominates nodes 0, 1, and 2 (3 dom {0, 1, 2}), but node 1 does not postdominate nodes 2 or 3. In FIG. 9, the factor nodes are node 0 and node 3.

FIG. 10 illustrates the factor subgraphs of the derivative graph 900 shown in FIG. 9. As shown by dotted lines in FIG. 10, factor subgraphs of node 3 are [3,1], [3,0]. Node 2 is not a factor node because the sole node dominated by 2 has only one parent and no node is postdominated by node 2. Node 1 is not a factor node because no nodes are dominated or postdominated by node 1.

Referring again to FIG. 10, the factor subgraphs of node 0 are [0,2], [0,3]. It should be noted that [3,0] and [0,3] are the same graph. Generally, this is true if both exists, in other words, [a,b]=[b,a]. However, [1,3] is not a factor subgraph even though [3,1] is a factor subgraph. This is because node 1 does not postdominate node 3 in the derivative graph 900 shown in FIG. 9. The bottom line is that the existence of [a,b] does not imply the existence of [b,a].

The graph of FIG. 9 can be factored using the factor subgraphs and the dominance relations for the graph. It should be noted that the graph has been numbered in a depth-first search (DFS) format. DFS is an algorithm for traversing or searching a tree, tree structure, or graph. The numbering begins at the root (selecting some node as the root) and explores as far as possible along each branch before backtracking. This means that the parents of node "b" will always have a higher number than node "b". Each edge, e, in the graph has nodes e.1, e.2, where the node number of e.2 is greater than the node number of e.1 such that e.2 will always be higher on the graph.

By way of example, in one embodiment the following pseudocode computes which edges to delete from the original derivative graph and which edge to add to a new factored edge:

```
given: a list L of factor subgraphs [X,Y]
and a graph G
S = empty subgraph edge
for each factor subgraph [A,B] in L {
    E = all edges which lie on a path from B to A
    for each edge e in E {
        if(isDominator(A) { //dominatorTest
            if(B rdom e.1 && A dom e.2) {
                delete e from G
            }
        }
        else { //postDominatorTest
            if(B dom e.2 && A rdom e.1) {
                delete e from G
            }
        }
        add e to S
    }
    add subgraph edge S to G, connecting node A to node B
    if any [X,Y] in L no longer exists delete [X,Y] from L
}
```

The edges of the subgraphs (or subgraph edges) that are added to the original graph are edges which themselves contain subgraphs. The subgraphs contained in the subgraph edges are isolated from the remainder of the original graph and behave as if they were a single edge. By way of example, FIG. 11 is a first example of the first embodiment of the efficient symbolic differentiation method and system illustrating the factoring of factor subgraph [0,2] shown in FIG. 10. If the factoring algorithm is applied to factor subgraph [0,2] it collapses to a new subgraph edge $d_7$, shown on the right side of FIG. 11. This means that factor subgraph [0,2] is factored out of the graph. This generates a new derivative graph 1100, which contains the edge subgraph $d_7$. FIG. 12 illustrates the edge subgraph $d_7$, which was factored out of the graph.

Factor node 0 is a postdominator node, and the edge labeled $d_4$ does not satisfy the postdominator test so it is not deleted from the original derivative graph. The three edges labeled $d_3$, $d_5$, $d_6$, do satisfy the postdominator test, so they are deleted. Also, because factor subgraph [3,1] no longer exists in the graph it is deleted from the list of factor subgraphs and not considered further.

FIG. 13 illustrates the factor subgraphs for the new derivative graph 1100 generated in FIG. 11. On the left side of the new derivative graph are the edge subgraphs [0,3] and [3,0]. Edge subgraph [0,3] is selected arbitrarily. All edges of the edge subgraph [0,3] satisfy the postdominator test, meaning that all edges can be deleted from the new derivative graph 1100. As shown in FIG. 13 on the right side, the resulting derivative graph 1300 has the single edge subgraph $d_8$. FIG. 14 illustrates the edge subgraph $d_8$ that was factored out of the graph 1100.

Alternatively, the edge subgraph [3,1] could have been factored out first. By way of example, FIG. 15 is a second example of the first embodiment of the efficient symbolic differentiation method and system illustrating the factoring of factor subgraph [3,1] shown in FIG. 10. Factor node 3 is a dominator node, and the edge $d_1$ does not satisfy the postdominator test so edge $d_1$ is not deleted from the original derivative graph. The three edges $d_0$, $d_2$, $d_3$ do satisfy the postdominator test so they are deleted. Because factor subgraph [0,2] no longer exists on the derivative graph, it is deleted from the list of factor subgraphs and not considered further. The right side of FIG. 15 illustrates the resulting derivative graph 1500. FIG. 16 illustrates the edge subgraph $d_7$ that was factored out of the graph 1500.

FIG. 17 illustrates the factor subgraph [3,0] for the derivative graph 1500 generated in FIG. 15. It should be noted that the derivative graph 1500 contains factor subgraphs [0,3] and [3,0]. Factor subgraph [3,0] is selected arbitrarily. All edges of the edge subgraph [3,0] satisfy the postdominator test, meaning that all edges can be deleted from the derivative graph 1500. As shown in FIG. 17 on the right side, the resulting derivative graph 1700 has the single edge subgraph $d_8$. FIG. 18 illustrates the edge subgraph $d_8$ that was factored out of the derivative graph 1700.

The efficient symbolic differentiation method and system computes the derivative from a factored derivative graph by summing the products along all product paths. In addition, the method recursively substitutes in factor subgraphs when necessary. For the factorization shown in FIGS. 11 and 13, the method computes the derivative, $f^0{}_0$, as follows:

$$f_0^0 = d_8 \qquad (1)$$
$$= d_1 d_7 + d_0 d_2 d_4$$
$$= d_1(d_5 d_6 + d_3 d_4) + d_0 d_2 d_4$$

For the factorization shown in FIGS. 15 and 17, the method computes the derivative, $f^0{}_0$, as follows:

$$f_0^0 = d_8 \qquad (2)$$
$$= d_1 d_5 d_6 + d_7 d_4$$
$$= d_1 d_5 d_6 + (d_1 d_3 + d_0 d_2) d_4$$

Factoring Functions Having Multiple Inputs and Multiple Outputs

The two factorizations of equations (1) and (2) are trivially different because they have the same number of operations (or operations count). This is true in general for all functions that have a single input and single output. However, this is not true for functions that have multiple inputs and multiple outputs (multiple input/multiple output). Mathematically, multiple input/multiple output functions can be represent as $f: \mathbb{R}^n \to \mathbb{R}^m$, where n is the number of inputs of the function and m is the number of outputs of the functions and where both n and m are greater than one. Thus, for multiple input/multiple functions, it makes a big difference which factor subgraph is factored first. The following discussion is a second embodiment of the efficient symbolic differentiation method, where the function has multiple input and multiple outputs.

FIG. 19 is a general flow diagram illustrating the second embodiment of the efficient symbolic differentiation method. The second embodiment of the method begins by expressing the multiple input/multiple function as an expression graph (box 1900). A derivative graph then is generated from the expression graph (box 1910). Next, the method determines that at least one node of the derivative graph satisfies the postdominator test or the dominator test (box 1920).

The method then factors out factor subgraphs from the derivative graph (box 1930). The order in which this is performed is such that a factor subgraph appearing most frequently in the derivative graph is factored first. The result is a factored derivative graph. As explained below, this order of factoring maximizes efficiency of computing the derivative. Next, the method computes a number of product paths that pass through each of a plurality of sub-products (box 1940). A sub-product is formed that has the highest path count (box 1950). As also explained below, this also maximize the efficiency of computing the derivative for a multiple input/multiple function. Finally, the derivative is computed by using the formed sub-product and summing each of the products along all products paths in the factored derivative graph (box 1960).

There are two complications that arise in factoring a multiple input/multiple output function that do not occur in the single input/single output case. The first complication includes the order in which the factor subgraphs are factored, and the second complication includes how to best form products paths after all factorizations have been performed. The way in which the second embodiment of the efficient symbolic differentiation method and system deals with each of these complications will be discussed in order.

Factor Subgraph Factoring Order

The derivative of a multiple input/multiple output function being evaluated (f) is the derivative of each of the function's n times m (nm) single input/single output constituent functions. Mathematically, this concept can be expressed as $nm\mathbb{R}^1 \to \mathbb{R}^1$. In general, these $nm\mathbb{R}^1 \to \mathbb{R}^1$ derivative graphs will have a non-empty intersection that represents redundant computations. In other words, there will be overlap in computations when computing each of the nm single input/single output constituent functions when determining the derivative of a multiple input/multiple output function.

As stated above in the first embodiment discussion where the function is a single input/single output function, the order in which factor subgraphs were factored made no difference to the total computation because all factorings were trivially different. However, for the multiple input/multiple output function case this is no longer true. FIG. 20 illustrates how the order of factor subgraph factoring is important for the second embodiment of the efficient symbolic differentiation method. On the left side of FIG. 20 is the original derivative graph 2000 of the multiple input/multiple output function. Moving left to right, FIG. 20 also illustrates the derivative graph 2010 for $f^o{}_1$ and the derivative graph 2020 for $f^o{}_0$. On the far right of FIG. 20, the dotted line indicates the subgraph 2030 in which the derivatives $f^o{}_1$ and $f^o{}_0$ intersect. This means that the subgraph 2030 is a common factor subgraph of $f^o{}_1$ and $f^o{}_0$.

If instead the method factors subgraph [0,3] from the original derivative graph 2000 shown in FIG. 20, then the result is shown in FIG. 21. In FIG. 21 starting left to right, the derivative graph 2100 for $f^o{}_1$ is shown as is the derivative graph 2110 for $f^o{}_0$. On the far right of FIG. 21, the dotted line indicates the intersection 2120 of derivatives $f^o{}_1$ and $f^o{}_0$ (or $f^o{}_0 \cap f^o{}_1$). It should be noted that there is no factor subgraph in either derivative graph 2100 for $f^o{}_1$ or for derivative graph 2110 for $f^o{}_0$. In this case, the resulting intersection 2120 does not contain a factor subgraph of either derivative.

If however, the method instead factors subgraph [4,2] from the original derivative graph 2000 shown in FIG. 20, then the result is shown in FIG. 22. In FIG. 22 starting left to right, the derivative graph 2200 for $f^o{}_1$ is shown along with the derivative graph 2210 for $f^o{}_0$. On the far right of FIG. 22, the dotted line indicates the intersection 2220 of derivatives $f^o{}_1$ and $f^o{}_0$ (or $f^o{}_0 \cap f^o{}_1$). In this case, the intersection of $f^o{}_0$ and $f^o{}_1$ (or $f^o{}_0 \cap f^o{}_1$) contains the common subgraph edge 4.2.

As can be seen from the FIGS. 20, 21 and 22, the computation required for $f^o{}_0$ is independent of whether factor subgraph [0,3] or [4,2] is factored first. However, the computation required to compute both $f^o{}_0$ and $f^o{}_1$ is significantly less if factor subgraph [4,2] is factored first. This is because the method can re-use the factor subgraph [4,2] expression in the factorization of the derivative $f^o{}_1$.

The efficient symbolic differentiation method addresses this issue of common factor subgraphs by counting the number of times each factor subgraph [i,j] appears in the nm derivative graphs. The factor subgraph that appears most frequently is factored first. If factor subgraph [k,l] disappears in some derivative graphs as a result of factorization, then the count of [k,l] is decremented. In order to determine whether a factorization has eliminated [k,l] from some derivative graph $f^i{}_j$ it is only necessary to count the children of a dominator node or the parents of a postdominator node. If either is equal to one, then the factor subgraph is not extant.

The efficient symbolic differentiation method efficiently updates the counts of the [k,l] subgraph during factorization by observing whether either node of a deleted edge is either a factor or a factor base node. In some embodiments, the efficient symbolic differentiation method uses a priority queue to efficiently update the ranking of the [k,l] subgraph.

By way of example, in one embodiment the following pseudocode determines an order in which the factor subgraphs are factored:

```
factorSubgraphs(function F) {
    hash table Counts: counts of [k,l]
    list Altered: [k,l] whose counts have changed due
        to factorization
    priority queue Largest: sorted by factor subgraph count
    foreach(derivative graph Fij in F) {
        compute factor subgraphs of Fij
        foreach(factor subgraph [k,l] in Fij) {
            if(Counts[[k,l]] == null) {
                Counts[[k,l]] = [k,l];
            }
            else { Counts[[k,l]].count += 1;
        }
        foreach([k,l] in Counts) { Largest.insert([k,l]); }
    }
    while(Largest not empty) {
        maxSubgraph = Largest.max
        foreach(Fij in which maxSubgraph occurs) {
            Altered.Add(Fij.factor(maxSubgraph))
        }
        foreach([k,l] in Altered) { Largest.delete([k,l]) }
        foreach([k,l] in Altered) { Largest.insert([k,l]) }
    }
}
```

Forming Path Products After Factorizations

The second complication includes how to best form path products after all factorizations have been performed. FIG. 23 is an example illustrating the problem of how to best form path products after all factorizations have been performed for a multiple input/multiple function having 3 inputs and 2 outputs (or $\mathbb{R}^3 \to \mathbb{R}^2$). In FIG. 23, each of the nm derivatives is completely factored. The problem becomes how to best form the six path products given by:

| | | |
|---|---|---|
| $f_0^0 = d_1 d_2 d_4$ | $f_1^0 = d_1 d_2 d_5$ | $f_2^0 = d_1 d_2 d_3$ |
| $f_0^1 = d_0 d_2 d_4$ | $f_1^1 = d_0 d_2 d_5$ | $f_2^1 = d_0 d_2 d_3$ |

It should be noted from the above that the sub-products $d_1 d_2$ and $d_0 d_2$ can each be used in 3 path products, whereas the sub-products $d_2 d_4$, $d_2 d_5$, and $d_2 d_3$ can each only be used in 2 path products. If the sub-products $d_1 d_2$ and $d_0 d_2$ are computed and re-used, then all six path products can be computed with only 8 multiplies (2+2*3=8 multiplies). In this simple example shown in FIG. 23, it is fairly easy to determine how to best form path products after all factorizations have been performed. However, for more complex derivative graphs, the problem becomes more difficult.

The efficient symbolic differentiation method addresses this issue of how to best form path products after all factorizations have been performed by computing the number of product paths that pass through each sub-product and then forming the sub-product having the highest path count. In one embodiment, the method performs this in two stages. First, the method computes the path counts of pairs of edges that occur in sequence along the path. Second, the method merges the highest pair count into an edge pair. This edge pair is inserted into all paths of all $f^i_j$ derivative graphs that contain the pair. This take time O(1) for each edge pair that is updated. The method continues until all paths in all $f^i_j$ derivative graphs are one edge long. Each edge pair may itself contain an edge pair and edges that may contain subgraphs, so the final evaluation of the derivative requires recursively expanding each of these data types as it is encountered.

In one embodiment the following pseudocode determines how to best form products paths after all factorizations have been performed. The following pseudocode assumes that each $f^i_j$ derivative graph is stored as a linked list of edges and employs a hash table (or similar data structure) so that any edge can be found in O(1) time. In order to simplify the presentation, all of the tests for special cases (such as null values), no previous or next edges and so forth have been eliminated. When the program terminates every $f^i_j$ derivative graph will contain a set of paths. Each of these paths will be a sequence that will contain one (and only one) of the following types: edges, edge subgraphs, and edge pairs. The pseudocode is as follows:

```
optimumSubproducts(graph G) {
  //count of paths edge e occurs on
  hash table Counts
  priority queue Largest: sorted by edge path count
  foreach(derivative graph Fij in G) {
    foreach(edge eSub in Fij) {
      if(eSub.isEdgeSubgraph) {
        foreach(edge e, e.next in eSub) {
          temp = new EdgePair(ei, e.next)
          Counts[temp].pathCount += 1
        }
      }
      else {
        temp = new EdgePair(ei, e.next)
        Counts[temp].pathCount += 1
      }
    }
  }
  foreach(EdgePair e in Counts) { Largest.insert(e) }
  while(Largest not empty) {
    maxProduct = Largest.max
    foreach(Fij which has maxProduct) {
      ei = Fij.find(maxProduct.edge1)
      eiNext = ei.next
      eiPrev = ei.previous
      eiNext2 = eiNext.next
      Fij.delete(ei)
      Fij.delete(eiNext)
      oldPair = new EdgePair(ei,eiNext)
      eiPrev.insertNext(oldPair)
      prevPair = new EdgePair(eiPrev,ei)
      nextPair = new EdgePair(eiNext,eiNext2)
      updateCounts(oldPair, prevPair,nextPair)
    }
  }
}
updateCounts(oldPair, prevPair, nextPair) {
  Counts.delete(oldPair)
  Largest.delete(oldPair)
  Counts[prevPair] – = 1
  Counts[nextPair] – = 1
  Largest.delete(prevPair)
  Largest.delete(nextPair)
  Largest.insert(prevPair)
  Largest.insert(nextPair)
}
```

III. Exemplary Operating Environment

The efficient symbolic differentiation method and system is designed to operate in a computing environment. The following discussion is intended to provide a brief, general description of a suitable computing environment in which the efficient symbolic differentiation method and system may be implemented.

FIG. 24 illustrates an example of a suitable computing system environment in which the efficient symbolic differentiation method and system may be implemented. The computing system environment 2400 is only one example of a suitable computing environment and is not intended to suggest any limitation as to the scope of use or functionality of the invention. Neither should the computing environment 2400 be interpreted as having any dependency or requirement relating to any one or combination of components illustrated in the exemplary operating environment.

The efficient symbolic differentiation method and system is operational with numerous other general purpose or special purpose computing system environments or configurations. Examples of well known computing systems, environments, and/or configurations that may be suitable for use with the efficient symbolic differentiation method and system include, but are not limited to, personal computers, server computers, hand-held (including smartphones), laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The efficient symbolic differentiation method and system may be described in the general context of computer-executable instructions, such as program modules, being executed by a computer. Generally, program modules include routines, programs, objects, components, data structures, etc., that perform particular tasks or implement particular abstract data types. The efficient symbolic differentiation method and system may also be practiced in distributed computing environments where tasks are performed by remote processing devices that are linked through a communications network. In a distributed computing environment, program modules may be located in both local and remote computer storage media including memory storage devices. With reference to FIG. 24, an exemplary system for the efficient symbolic differentiation method and system includes a general-purpose computing device in the form of a computer 2410 (the computing device 110 is an example of the computer 2410).

Components of the computer 2410 may include, but are not limited to, a processing unit 2420 (such as a central processing unit, CPU), a system memory 2430, and a system bus 2421 that couples various system components including the system memory to the processing unit 2420. The system bus 2421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 2410 typically includes a variety of computer readable media. Computer readable media can be any available media that can be accessed by the computer 2410 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 2410. Communication media typically embodies computer readable instructions, data structures, program modules or other data in a modulated data signal such as a carrier wave or other transport mechanism and includes any information delivery media.

Note that the term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 2440 includes computer storage media in the form of volatile and/or nonvolatile memory such as read only memory (ROM) 2431 and random access memory (RAM) 2432. A basic input/output system 2433 (BIOS), containing the basic routines that help to transfer information between elements within the computer 2410, such as during start-up, is typically stored in ROM 2431. RAM 2432 typically contains data and/or program modules that are immediately accessible to and/or presently being operated on by processing unit 2420. By way of example, and not limitation, FIG. 24 illustrates operating system 2434, application programs 2435, other program modules 2436, and program data 2437.

The computer 2410 may also include other removable/non-removable, volatile/nonvolatile computer storage media. By way of example only, FIG. 24 illustrates a hard disk drive 2441 that reads from or writes to non-removable, nonvolatile magnetic media, a magnetic disk drive 2451 that reads from or writes to a removable, nonvolatile magnetic disk 2452, and an optical disk drive 2455 that reads from or writes to a removable, nonvolatile optical disk 2456 such as a CD ROM or other optical media.

Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 2441 is typically connected to the system bus 2421 through a non-removable memory interface such as interface 2440, and magnetic disk drive 2451 and optical disk drive 2455 are typically connected to the system bus 2421 by a removable memory interface, such as interface 2450.

The drives and their associated computer storage media discussed above and illustrated in FIG. 24, provide storage of computer readable instructions, data structures, program modules and other data for the computer 2410. In FIG. 24, for example, hard disk drive 2441 is illustrated as storing operating system 2444, application programs 2445, other program modules 2446, and program data 2447. Note that these components can either be the same as or different from operating system 2434, application programs 2435, other program modules 2436, and program data 2437. Operating system 2444, application programs 2445, other program modules 2446, and program data 2447 are given different numbers here to illustrate that, at a minimum, they are different copies. A user may enter commands and information (or data) into the computer 2410 through input devices such as a keyboard 2462, pointing device 2461, commonly referred to as a mouse, trackball or touch pad, and a touch panel or touch screen (not shown).

Other input devices (not shown) may include a microphone, joystick, game pad, satellite dish, scanner, radio receiver, or a television or broadcast video receiver, or the like. These and other input devices are often connected to the processing unit 2420 through a user input interface 2460 that is coupled to the system bus 2421, but may be connected by other interface and bus structures, such as, for example, a parallel port, game port or a universal serial bus (USB). A monitor 2491 or other type of display device is also connected to the system bus 2421 via an interface, such as a video interface 2490. In addition to the monitor, computers may also include other peripheral output devices such as speakers 2497 and printer 2496, which may be connected through an output peripheral interface 2495.

The computer 2410 may operate in a networked environment using logical connections to one or more remote computers, such as a remote computer 2480. The remote computer 2480 may be a personal computer, a server, a router, a network PC, a peer device or other common network node, and typically includes many or all of the elements described above relative to the computer 2410, although only a memory storage device 2481 has been illustrated in FIG. 24. The logical connections depicted in FIG. 24 include a local area network (LAN) 2471 and a wide area network (WAN) 2473, but may also include other networks. Such networking environments are commonplace in offices, enterprise-wide computer networks, intranets and the Internet.

When used in a LAN networking environment, the computer 2410 is connected to the LAN 2471 through a network interface or adapter 2470. When used in a WAN networking environment, the computer 2410 typically includes a modem 2472 or other means for establishing communications over the WAN 2473, such as the Internet. The modem 2472, which may be internal or external, may be connected to the system bus 2421 via the user input interface 2460, or other appropriate mechanism. In a networked environment, program modules depicted relative to the computer 2410, or portions thereof, may be stored in the remote memory storage device. By way of example, and not limitation, FIG. 24 illustrates remote application programs 2485 as residing on memory device 2481. It will be appreciated that the network connections shown are exemplary and other means of establishing a communications link between the computers may be used.

The foregoing Detailed Description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A method for performing symbolic differentiation of a function, comprising:
    using a computing device to perform the following:
        representing the function as an expression graph;
        constructing a derivative graph from the expression graph to graphically represent a derivative of the function;
        factoring the derivative graph to its common factors and identifying common product sub-sequences to obtain a plurality of factor subgraphs to generate a factored derivative graph; and
        computing the derivative as a sum of products along all product paths in the factored derivative graph.

2. The method of claim 1, further comprising:
    determining that at least one node on the derivative graph satisfies a postdominator test or a dominator test; and
    factoring the derivative graph until no additional factoring can be performed.

3. The method of claim 1, wherein factoring further comprises replacing a factor subgraph with an edge subgraph containing a single edge.

4. The method of claim 3, further comprising replacing each of the factor subgraphs with corresponding edge subgraphs until the factored derivative graph collapses into a single edge.

5. The method of claim 1, wherein the function is a multiple input and multiple output function having n inputs and m outputs, and further comprising:
    generating n multiplied by m (nm) number of derivative graphs by taking derivatives with respect to each of a plurality of range elements; and
    finding factor subgraphs where each of the derivative graphs intersect.

6. The method of claim 5, further comprising:
    counting a frequency in which the factor subgraphs appear in the derivative graphs;
    ranking each of the factor subgraphs using a priority queue in an order based on the frequency such that a factor subgraph having a highest frequency has a highest ranking; and
    factoring first a factor subgraph having a highest ranking in the priority queue.

7. The method of claim 6, further comprising updating the ranking of each factor subgraph such that the ranking is changes each time a factor subgraph in the derivative graph due to factorization.

8. The method of claim 1, further comprising:
    generating intermediate results for each product path in the factored derivative graph;
    determining sub-products that are common between intermediate results;
    determining a number of product paths that pass through each of the sub-products; and
    forming an optimal sub-product having a highest number of product paths that pass through each of the sub-products.

9. The method of claim 8, further comprising:
    computing a path counts of pairs of edges that occur in sequence along a product path; and
    determining a highest path count;
    merging the highest pair count into an edge pair; and
    inserting the edge pair into product paths of derivative graph containing the edge pair.

10. A computer-readable storage device having stored thereon computer-executable instructions running on a computing device for computing a derivative of a function having a single input and a single output, comprising:
    constructing a derivative graph that graphically represents the derivative of the function, the derivative graph having nodes and edges that connect the nodes such that each edge represent a term;
    determining that at least one node of the derivative graph satisfies a postdominator test or a dominator test;
    generating a factored derivative graph by factoring the derivative graph to its common factors and identifying common product sub-sequences until no additional factoring can occur; and
    computing the derivative as the sum of products along all possible product paths in the factored derivative graph.

11. The computer-readable storage device of claim 10, further comprising defining a product path as a path along the factored derivative graph from the single input to the single output or vice versa.

12. The computer-readable storage device of claim 10, further comprising identifying a potential factorization of the derivative graph when two or more products paths pass through a same node en route to a root or a leaf of the derivative graph.

13. The computer-readable storage device of claim 10, wherein the postdominator test further comprises:
    identifying a first node and a second node on the derivative graph;
    recognizing that the first node is on every product path from the second node to a leaf on the derivative graph; and
    concluding that the first node satisfies the postdominator test.

14. A computer-implemented process for computing a derivative of a function having multiple inputs and multiple outputs, comprising:
    expressing the function as an expression graph;
    generating a derivative graph from the expression graph, wherein the derivative graph contains a plurality of nodes and edges that connect the nodes to each other, wherein each of the edges has an associated mathematical term;
    determining that at least one node of the derivative graph satisfies a postdominator test or a dominator test;

factoring the derivative graph to its common factors and identifying common product sub-sequences to obtain a plurality of factor subgraphs such that a factor subgraph appearing most frequently in the derivative graph is factored first to generate a factored derivative graph; and computing the derivative by summing the each product of all product paths along the factored derivative graph.

15. The computer-implemented process of claim 14, further comprising:

keeping a count of the number of times each of the factor subgraphs appears in the derivative graph; and decrementing the count for a certain factor subgraph whenever during factorization the factor subgraph disappears.

16. The computer-implemented process of claim 15, further comprising updating the count by observing whether a node of a deleted edge is either a factor or a factor base node.

17. The computer-implemented process of claim 14, further comprising:

computing a number of product paths that pass through each of a plurality of sub-products; and forming a sub-product having a highest path count.

18. The computer-implemented process of claim 17, further comprising computing path counts of pairs of edges that occur in sequence along the product paths.

19. The computer-implemented process of claim 18, further comprising merging a highest pair count into an edge pair.

20. The computer-implemented process of claim 19, further comprising:

inserting the edge pair into all paths of all derivative graphs that contain the edge pair; and continuing the above process until all path in all derivative graphs are one edge long.

* * * * *